Apr. 10, 1923.
J. L. WEATHERWAX
THERMOCELL
Filed Feb. 27, 1919
1,451,283
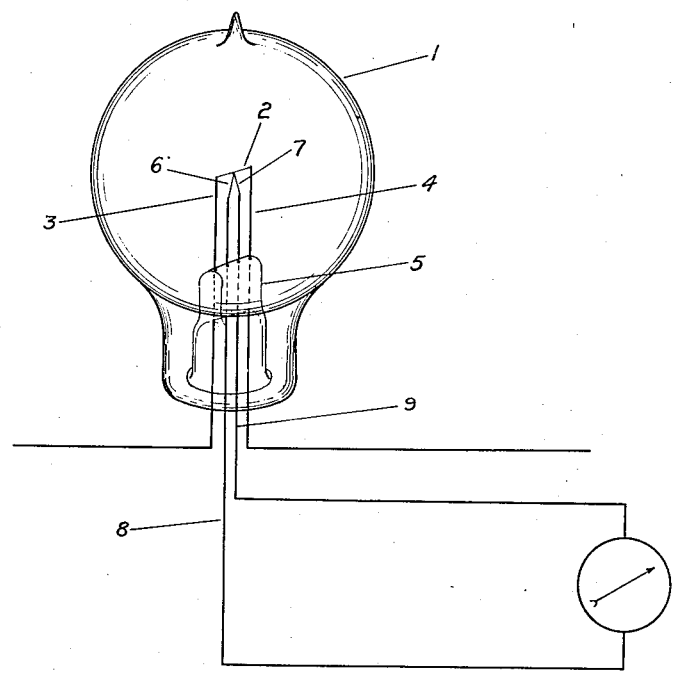
INVENTOR
James L. Weatherwax.
BY
ATTORNEY Patented Apr. 10, 1923.

1,451,283

UNITED STATES PATENT OFFICE.

JAMES L. WEATHERWAX, OF WILKINSBURG, PENNSYLVANIA, ASSIGNOR TO WESTINGHOUSE LAMP COMPANY, A CORPORATION OF PENNSYLVANIA.

THERMOCELL.

Application filed February 27, 1919. Serial No. 279,506.

To all whom it may concern:

Be it known that I, JAMES L. WEATHERWAX, a citizen of the United States, and a resident of Wilkinsburg, in the county of Allegheny and State of Pennsylvania, have invented a new and useful Improvement in Thermocells, of which the following is a specification.

My invention relates to electrical measuring apparatus, and, more particularly, to a thermo-cell used in conjunction with an instrument for measuring an electrical quantity.

In measuring an electrical quantity, such as the strength of a current, a simple form of millivoltmeter, including a thermo-cell or bulb, is frequently used. Such a cell has heretofore comprised an evacuated sealed envelope having a thermal element mounted therein and connected to a thermo-couple. An indicating device or meter is connected to the thermo-couple of the cell and is so graduated that its readings directly indicate the current through the heating element of the cell. A serious commercial disadvantage of this type of measuring instrument is that, upon failure of the thermo bulb, it is necessary to recalibrate the instrument on account of variations in the functioning of the thermo-cell, which variations are inherent in the process of manufacture. These manufacturing variations are due to differences in the connections between the thermal elements and the thermo-couples and to differences in the sizes and effective lengths of the thermal elements, etc.

To overcome the above mentioned difficulties, I propose to provide a sealed envelope or bulb with a gas which is inert with respect to the thermal element, and I have found that, by varying the pressure of this gas, it is possible to control the thermal electromotive force of the couple so that, by adjusting the gas pressure, it is possible to compensate for manufacturing variations and eliminate the necessity of recalibrating the millivoltmeter or other measuring instrument with which the bulb is associated.

I have further discovered that, if the gas inserted within the bulb has a high thermal conductivity, such as hydrogen, the time within which a steady value or deflection is reached on the recording instrument is greatly shortened. This feature is of considerable importance in measuring currents of short duration.

Other features of my invention have to do with increasing the general efficiency of a thermo-cell, and the nature of the means by which the same is effectuated will appear from the following detailed description.

In the accompanying drawing, I have illustrated diagrammatically one embodiment of my invention with its associate apparatus.

Referring to the drawing, the thermo-cell comprises a sealed envelope or bulb 1 and a contained gas that possesses high thermal conductivity and is inert with respect to metal, when heated. For this gas I prefer to use hydrogen, although argon, nitrogen, etc. may be used. The hydrogen may be introduced into the bulb at the time it is exhausted, and the pressure thereof will be regulated by reference to the deflection produced upon a measuring instrument by the passage of an electric current through the heater 2, as will hereinafter be more fully explained. Within the bulb is located a filamentary heater 2 consisting of nickel steel or other refractory metal and connected to conductors 3 and 4 sealed into the glass stem 5. Secured to the heater 2, preferably at a point midway between its supports, is a filamentary thermo-couple comprising wires 6 and 7 which may be of any suitable diameter and may be iron and advance wire, respectively, or other metals capable of producing a thermo-electric effect at their junction. As shown in the drawing, the thermocouple is welded to the heater 2 at the junction of its elements 6 and 7; in performing this operation of welding, care must be taken not to weld the thermo-couple to the heater in such position that the junction of the thermo-couple elements extends beyond the heater, but it is immaterial if the thermocouple be so welded that its junction is below the heater, in which case continuations of the thermo-couple elements would be welded to the heater 2. The wires forming the thermo-couple are connected to sealed-in conductors 8 and 9. In practice, the conductors 3 and 4 of the thermo-cell are connected to a source of current to be measured, and conductors 8 and 9 are connected to a measuring instrument, such as a millivoltmeter, which may be so graduated that the thermal electromotive force of the thermocell shall give a direct reading of the current strength.

It is obvious that, due to mechanical variations, the size of the heater, as regards its diameter and effective length, will differ in different thermo bulbs. It will further be observed that the connection of the thermo-couple with the heater will not be uniform, resulting in a difference in the electromotive force which may be produced at the thermal junction. These variations may be compensated for by varying the pressure of the hydrogen, since its function is to establish a thermal equilibrium within the bulb by virtue of its high thermal conductivity, and, as its volume is proportional to its pressure, the greater will be its equalizing effect upon the temperature of the heater element when the hydrogen is under substantial pressure.

The cooling effect exerted by the hydrogen upon the heater element will accelerate the functioning of the thermo-couple so that a measuring instrument connected thereto will reach a constant reading for a definite current through the heater within a short period of time. It will therefore be seen that, due to the properties of the gas used within the bulb, by varying the gas pressure and keeping the current constant, corresponding thermal electromotive forces may be obtained from thermo-cells having structural variations. Also, by controlling the gas pressure within a given bulb it may be made to give the same meter reading at different current values.

From the above, it will be apparent that, by practicing my invention, it is possible to construct a plurality of thermo-cells having structural variations which will give the same reading for a current of given strength when associated with a measuring instrument. Expressed in another way, my invention will permit the standardization of a thermo-cell which will give a desired reading when associated with any measuring instrument of the thermal type and calibrated with reference to a standard meter.

In the appended claims the gas enclosed within the bulb of the thermo cell is referred to as "inert," and by this term it is wished to be understood that the gas is of such a character as to be inert with respect to the metal composing the heater element and thermo-couple.

What I claim as my invention is:

1. The method of controlling the functioning of a thermo-cell which consists in regulating the temperature of a heater element in contact with a thermo-couple by adjusting the pressure of an inert gas surrounding said element.

2. The method of controlling the functioning of a thermo-cell which consists in regulating the temperature of a heater element in contact with a thermo-couple by adjusting the pressure of an inert gas having high thermal conductivity and surrounding said elements.

3. The method of standardizing the thermal electromotive force generated by a thermo-cell upon the application of a given current, which consists in regulating the temperature of a heater element in contact with a thermo-couple by adjusting the pressure of an inert gas surrounding said elements.

4. A thermo-cell comprising an envelope having a heater element mounted therein, a thermo-couple connected to said heater element, and a gas within the envelope inert with respect to said element and couple, said gas having such pressure that, upon the passage of a definite current through the heater element, a given electrical reading is obtained.

5. The combination with a source of current and a meter, of a thermo-cell comprising an envelope having a heater element mounted therein and adapted to be electrically heated, a thermo-couple connected to said heater element and a gas within said envelope capable of quickly establishing a thermal equilibrium by rapidly conducting the heat away from the heater element, thereby quickly effecting a steady deflection upon a meter included in a circuit energized by the thermal electro-motive force resulting from an electric current traversing the heater element.

6. The combination with a source of current and a meter, of a thermo-cell comprising an envelope having a heater element mounted therein and adapted to be electrically heated, a thermo-couple connected to said heater element and hydrogen gas within the envelope under an initially preadjusted pressure, whereby, due to the high thermal conductivity of the hydrogen there may be quickly obtained a steady deflection upon a meter included in a circuit energized by the thermal electro-motive force resulting from an electric current traversing the heater element.

In testimony whereof, I have hereunto subscribed my name this 25th day of Feb., 1919.

JAMES L. WEATHERWAX.